US012644540B2

(12) United States Patent
Neumair et al.

(10) Patent No.: US 12,644,540 B2
(45) Date of Patent: Jun. 2, 2026

(54) METHOD FOR DETERMINING THE POSITION OF AN ARMATURE OF AN ELECTROMAGNET AND FLUID SYSTEM

(71) Applicant: HAWE Hydraulik SE, Aschheim (DE)

(72) Inventors: Markus Neumair, Aschheim (DE); Benjamin Hasner, Aschheim (DE)

(73) Assignee: HAWE Hydraulik SE, Aschheim (DE)

( * ) Notice: Subject to any disclaimer, the term of this patent is extended or adjusted under 35 U.S.C. 154(b) by 630 days.

(21) Appl. No.: 18/177,192

(22) Filed: Mar. 2, 2023

(65) Prior Publication Data

US 2023/0279965 A1      Sep. 7, 2023

(30) Foreign Application Priority Data

Mar. 4, 2022    (DE) ..................... 10 2022 202 224.6

(51) Int. Cl.
| | |
|---|---|
| *F16K 37/00* | (2006.01) |
| *F15B 19/00* | (2006.01) |
| *F16K 31/06* | (2006.01) |
| *H01F 7/18* | (2006.01) |

(52) U.S. Cl.
CPC ........ *F16K 37/0041* (2013.01); *F15B 19/005* (2013.01); *F16K 31/0675* (2013.01); *H01F 2007/185* (2013.01)

(58) Field of Classification Search
CPC ........... F16K 37/0041; H01F 2007/185; F15B 19/005
See application file for complete search history.

(56) References Cited

FOREIGN PATENT DOCUMENTS

| | | | |
|---|---|---|---|
| DE | 10 2011 083 007 A1 | 3/2013 | |
| DE | 102019131406 A1 * | 5/2021 | ........... H01F 7/1844 |
| DE | 102019219247 A | 6/2021 | |
| EP | 1288449 A1 * | 3/2003 | ................ F01L 9/20 |

OTHER PUBLICATIONS

German Examination Report for German Application No. 10 2022 202 224.6, dated Oct. 26, 2022, 10 pages.

* cited by examiner

*Primary Examiner* — Atif H Chaudry
(74) *Attorney, Agent, or Firm* — Dinsmore & Shohl LLP

(57) ABSTRACT

A method for determining the position of an armature of an electromagnet, a method for determining the position of a valve member of an electromagnetically actuated fluid valve, and a fluid system comprising an electromagnetically actuated fluid valve and an electronic control unit executing the method for determining the position of a valve member are provided. The electronic control unit applies a current profile in the coil of a non-actuated electromagnet that is substantially below a minimum actuation current of the electromagnet. By applying the current profile, the electronic control unit determines a characteristic profile of the electromagnet. A position characteristic of the electromagnet is calculated based on the position characteristic.

19 Claims, 3 Drawing Sheets

10

11          15

13          12          14

20

21          25

23          22

METHOD FOR DETERMINING THE POSITION OF AN ARMATURE OF AN ELECTROMAGNET AND FLUID SYSTEM

CROSS REFERENCE TO RELATED APPLICATION

This application claims priority to German Application 10 2022 202 224.6, filed Mar. 4, 2022, which is hereby incorporated by reference in its entirety.

FIELD OF THE INVENTION

The present invention relates to a method for determining the position of an armature of an electromagnet, a method for determining the position of a valve member of an electromagnetically actuated fluid valve, and a fluid system comprising an electromagnetically actuated fluid valve and an electronic control unit.

BACKGROUND OF THE INVENTION

For the purposes of this invention, a fluid system means a hydraulic system or a pneumatic system. A fluid valve may accordingly be a hydraulic valve or a pneumatic valve.

A fluid system including an electromagnetically actuated fluid valve and an electronic control unit provides a wide variety of functionalities to the user. For example, such a fluid system may include a directly controlled electromagnetically actuated fluid valve having a first electromagnet and a second electromagnet acting in a complementary manner to the first electromagnet, which is controlled by the electronic control unit. Such a fluid valve provides, for example, a variable volume flow to the user depending on a variable opening cross-section of the fluid valve. In this case, the first electromagnet and the second electromagnet are controlled by the electronic control unit to move a valve member of the fluid valve. The valve member can be, for example, a spool piston or also a valve cone of a seat valve. For this purpose, an actuating element is connected to an armature of the respective electromagnet, so that the actuating element, for example an actuating rod, transmits a movement of the armature of the respective electromagnet directly to the valve member. By moving the valve member, the opening cross-section of the fluid valve is changed and a volume flow dependent on the opening cross-section is made available via the fluid valve.

The opening cross-section of such a fluid valve depends primarily on the reciprocal energization of the two electromagnets, so that the electronic control unit can basically control the volumetric flow flowing through the fluid valve by controlling the energization of the two electromagnets. However, the actual opening cross-section of the fluid valve also depends on other parameters such as hysteresis effects, friction effects, a system pressure or temperatures such as the ambient temperature and the system temperature. These disturbance variables lead to a control error, which is basically undesirable and should be compensated. For this purpose, independent position sensors for monitoring the position of the valve member and downstream control loops are regularly used in the state of the art. Depending on the measuring principle, modern position sensors have two to three coils for detecting the position of an armature within the coils. This enables the use of temperature-independent measuring principles and thus ensures a high temporal and spatial resolution in position measurement. However, such position sensors are costly and require additional installation space. Moreover, each additional component in the overall system naturally also represents an additional potential source of error.

SUMMARY OF THE INVENTION

Hence, it is an object of the present invention to provide a possibility of monitoring the position of a valve member of a directly controlled electromagnetically actuated fluid valve that is less expensive than known solutions, takes up less installation space, and provides a reduction in the risk due to component failure.

The problem is solved first with a method for determining the position of an armature of an electromagnet according to embodiments disclosed herein.

The method according to the invention for determining the position of an armature of an electromagnet, in particular of an electromagnet of an electromagnetically actuated fluid valve, the electromagnet comprising a coil and an armature, is performed by an electronic control unit and comprises the following steps:

- applying a current profile in the coil of the electromagnet, the current profile being substantially below a minimum actuation current of the electromagnet,
- determining a characteristic profile of the electromagnet, and
- calculating the position of the armature of the electromagnet depending on the characteristic profile.

In particular, the electromagnet is a electromagnet of a directly controlled electromagnetically actuated fluid valve. In particular, the directly controlled electromagnetically actuated fluid valve is a directly controlled electromagnetically actuated hydraulic valve.

A minimum actuating current of the electromagnet is to be understood as the current that must flow at least in the coil of the electromagnet so that the armature of the electromagnet is moved and the fluid valve is switched. The fact that the current profile is essentially below the minimum actuation current means that a maximum current value of the current profile can also be temporarily higher than the minimum actuation current, but the current profile does not lead to a movement of the armature of the electromagnet overall. Due to the inertia of the fluid valve, sufficiently short current peaks above the minimum actuation current would not cause the armature of the electromagnet to move. Consequently, the current profile is such that the electromagnet armature is not moved by the current in the electromagnet coil when the current in the electromagnet coil follows the current profile. In other words, the electromagnet is not actuated when the current in the coil of the electromagnet is substantially below the minimum actuation current. Consequently, that the electromagnet is not actuated means, for the purposes of this invention, that the electromagnet is not being used to switch the fluid valve. The armature of the non-actuated electromagnet can of course still be moved indirectly, for example by actuation of the fluid valve by another electromagnet.

A characteristic profile in the sense of the present invention is understood to be one or more characteristics or measured values which can, for example, also be calculated with each other. The characteristic profile comprises values determined by the method according to the invention, but can also comprise values specified by the system, such as temperature coefficients or other coefficients distinctive for the respective electromagnet.

The term "determining" as used here includes one or more process steps such as controlling, regulating, measuring and/or calculating in order to determine the corresponding value. Values specified by the system can also be used for determination.

In particular, the electronic control unit comprises a current sensor for measuring the current in the coil of the electromagnet and a electromagnet control unit which controls the actuation of the electromagnet in a generally known manner by means of a supply voltage.

By the method according to the invention, the position of the armature of the electromagnet can be determined by the characteristic profile without the use of an independent position sensor, if the electromagnet is not actuated, i.e. is not used for switching the fluid valve at the moment of the position determination according to the invention. Thus, the non-actuated electromagnet is used to implement the functionality of a position sensor. As a result, manufacturing costs can be saved, the required installation space reduced and the reliability of the overall system in which the electromagnet is used increased, since fewer system components need to be used overall due to the omission of the position sensor.

Preferably, the method according to the invention is configured so that applying of the current profile comprises the following steps:

setting the current in the coil of the electromagnet to a first defined current value during a first time interval, regulating the current in the coil of the electromagnet to the first defined current value during a second time interval, and turning off the current in the coil of the electromagnet during a third time interval, further wherein determining the characteristic profile comprises the following steps:

determining a compensation characteristic of the electromagnet during the second time interval, and determining a position characteristic of the electromagnet during the third time interval.

Setting the current in the coil of the electromagnet to the first defined current value includes, in particular, fast control of the current in the coil of the electromagnet. The sole objective of the fast control is to set the current to the first defined current value as quickly as possible. In particular, during the fast control, the electromagnet control unit switches the supply voltage through unclocked until the current in the coil of the electromagnet measured by the current sensor corresponds to the first defined current value. The fast control of the current in the coil of the electromagnet can also be referred to as fast excitation of the electromagnet.

Turning off the current in the coil of the electromagnet means in particular that no external voltage is applied to the electromagnet, so that the energy stored in the electromagnet during the second time interval is dissipated during the third time interval. The state during the third time interval is also referred to as active free-running.

By the method according to the invention, the position of the armature of the electromagnet can be determined by the compensation characteristic and the position characteristic without the use of an independent position sensor when the electromagnet is not actuated. Thus, the non-actuated electromagnet is used to implement the functionality of a position sensor. This can save manufacturing costs, reduce the required installation space and increase the reliability of the overall system in which the electromagnet is used, since fewer system components need to be used overall due to the omission of the position sensor.

Preferably, the compensation characteristic of the electromagnet is a temperature-dependent compensation characteristic of the electromagnet. In this way, a temperature dependency can be taken into account and compensated for when determining the position of the armature of the electromagnet.

Preferably, the temperature-dependent compensation characteristic of the electromagnet is the electrical resistance, in particular the copper resistance, of the coil of the electromagnet. The copper resistance of the coil of the electromagnet can be easily determined during the second time interval.

Preferably, the position characteristic of the electromagnet is a temperature-dependent and inductance-dependent position characteristic of the electromagnet. The temperature dependence can be compensated by allocation with the compensation characteristic. The inductance of an electromagnet depends in particular on the position of the armature within the coil, so that the position of the armature in the coil can be calculated via the inductance dependence.

Furthermore, it is preferable if the temperature-dependent and inductance-dependent position characteristic of the electromagnet is the current decrease speed in the coil of the electromagnet. The current decrease speed in the coil of the electromagnet depends on the inductance of the electromagnet and thus on the position of the armature in the coil. The armature is known to be made of a ferromagnetic material in particular. Consequently, when the armature is fully positioned in the coil of the electromagnet, the inductance of the electromagnet is highest. If the armature is only partially positioned in the coil of the electromagnet, the inductance of the electromagnet is correspondingly lower. During the third time interval, the energy stored in the electromagnet during the second time interval dissipates essentially as a current across the copper resistance of the coil. The stored energy depends on the inductance of the electromagnet and thus on the position of the armature in the coil. Furthermore, the current decrease speed also depends on the temperature. This temperature dependence can be compensated for by allocation with the compensation characteristic. The position of the armature in the coil can thus be calculated via the current decrease speed of the electromagnet. The higher the current decrease speed, the lower the inductance of the electromagnet and the less far the armature is positioned in the coil of the electromagnet and vice versa.

Preferably, regulating the current in the coil of the electromagnet to the first defined current value during the second time interval is performed by pulse width modulation. This enables low-loss and precise control of the current in the coil of the electromagnet.

Advantageously, determining the compensation characteristic of the electromagnet comprises determining the average voltage across the electromagnet, determining the average current in the coil of the electromagnet, and calculating the compensation characteristic as a function of the average voltage and the average current. The average voltage across the electromagnet is the voltage necessary to regulate the current in the coil of the electromagnet to the first defined current value. In particular, the first defined current value is set as the average current in the coil of the electromagnet. Alternatively, determining the average current in the coil of the electromagnet comprises measuring the average current in the coil of the electromagnet. Depending on how exactly regulating the current in the coil of the electromagnet is implemented to the first defined current value, the average current in the coil of the electromagnet may differ slightly from the first defined current value. Then, it may be advantageous if the average current is measured to achieve a more accurate result in determining the compensation characteristic. In this way, the compensation characteristic can be determined on the basis of easily available quantities.

Preferably, determining the average voltage across the electromagnet comprises measuring a supply voltage during the second time interval and multiplying the measured supply voltage by a duty cycle of the pulse width modulation. Thus, the average voltage across the electromagnet can be determined efficiently and accurately.

Alternatively, determining the average voltage across the electromagnet comprises measuring the voltage across the electromagnet during the second time interval and averaging the measured voltage across the electromagnet. Thus, an alternative way of determining the average voltage across the electromagnet is shown.

Alternatively, applying the current profile includes the following steps:

applying a regulated voltage to the coil of the electromagnet during a first time interval until a first defined current value is reached, and turning off the current in the coil of the electromagnet during a third time interval, further wherein determining the characteristic profile comprises the following steps:

determining a compensation characteristic of the electromagnet during the first time interval, and determining a position characteristic of the electromagnet during the third time interval.

According to the alternative method, the first time interval and the second time interval are combined to form a new first time interval. During the first time interval, a defined regulated voltage is applied to the coil of the electromagnet so that the same general conditions always prevail during the first time interval.

When the first defined current value in the coil of the electromagnet is reached, the current in the coil of the electromagnet is turned off and the third time interval begins directly, as already described above. The alternative method thus differs from the method described above only in the configuration of the first time interval during which the compensation characteristic is determined.

Also by this alternative method according to the invention, the position of the armature of the electromagnet can be determined by the compensation characteristic and the position characteristic without the use of an independent position sensor when the electromagnet is not actuated. The further advantages described above with regard to the omission of a position sensor also naturally apply to this alternative method.

Preferably, in the alternative method according to the invention, the compensation characteristic is the current increase speed in the coil of the electromagnet. The current increase speed in the coil of the electromagnet is dependent on the temperature and the inductance of the electromagnet. The temperature dependence of the current increase speed in the coil is inverse to the temperature dependence of the current decrease speed in the coil. This means that the current increase speed can also be used as a compensation characteristic for temperature compensation.

Preferably, determining the position characteristic comprises detecting a first instant at which the current in the coil of the electromagnet reaches a second defined current value, detecting a second instant at which the current in the coil of the electromagnet reaches a third defined current value that is lower than the second defined current value, and calculating the position characteristic as a function of a time difference between the second instant and the first instant and a current difference between the second defined current value and the third defined current value. In particular, the second defined current value is lower than the first defined current value. In this way, an uncertainty of measurement or fuzziness respectively in the detection of the first instant can be avoided. The second defined current value and the third defined current value are thus fixed threshold values for the current in the coil of the electromagnet and when they are reached, the first instant and the second instant are detected, respectively. Consequently, the current difference is predetermined to be constant and the time difference varies depending on the position of the armature in the coil. This ensures comparability of the results for the position characteristic, which can thus be determined in a simple manner.

It is preferable to repeat the process steps. By repeating the process steps, continuous determination of the position of the armature of the electromagnet is possible while the electromagnet is not actuated.

Furthermore, the problem is solved with a method for determining the position of a valve member of an electromagnetically actuated fluid valve, wherein the electromagnetically actuated fluid valve comprises the valve member and, an electromagnet for actuating the valve member, the electromagnet comprising a coil and an armature, the method comprising the following steps:

determining the position of the armature of the electromagnet (23) by the method according the invention as described above, and calculating the position of the valve member depending on the position of the armature of the electromagnet.

In particular, the electromagnetically actuated fluid valve is a directly controlled electromagnetically actuated fluid valve. In particular, the directly controlled electromagnetically actuated fluid valve is a directly controlled electromagnetically actuated hydraulic valve. Since the position of the valve member is directly dependent on the position of the armature of the electromagnet that actuates the valve member, the present method can directly calculate the current position of the valve member when the electromagnet is not actuated by determining the position of the armature. This eliminates the need for a stand-alone position sensor to detect the position of the valve member.

Furthermore, the problem is solved with a method for determining the position of a valve member of an electromagnetically actuated fluid valve, the electromagnetically actuated fluid valve comprising the valve member and, for actuating the valve member, a first electromagnet with a first coil and a first armature and a second electromagnet, acting complementary to the first electromagnet, with a second coil and a second armature, the method comprising the following steps:

determining an non-actuated electromagnet of the electromagnetically actuated fluid valve, determining the position of the armature of the non-actuated electromagnet by the method according to the invention as described above, and calculating the position of the valve member depending on the position of the armature of the non-actuated electromagnet.

In particular, the electromagnetically actuated fluid valve is a directly controlled electromagnetically actuated fluid valve. In particular, the directly controlled electromagnetically actuated fluid valve is a directly controlled electromagnetically actuated hydraulic valve. In the case of an electromagnetically actuated fluid valve having two electromagnets for actuating the valve member, one of the two complementarily acting electromagnets is regularly not actuated. As a result, the position of the armature and thus the position of the valve member can be determined continuously by the present method for the respective non-actuated electromagnet. This eliminates the need for a separate position sensor to detect the position of the valve member.

Furthermore, the problem is solved with a fluid system comprising an electromagnetically actuated fluid valve and an electronic control unit, wherein the electromagnetically actuated fluid valve comprises a valve member and an electromagnet with a coil and an armature for actuating the valve member. Thereby, the electronic control unit is adapted to execute the inventive method described above for determining the position of a valve member when the electromagnet is not actuated.

In particular, the fluid system is a hydraulic system. In particular, the electromagnetically actuated fluid valve is a directly controlled electromagnetically actuated fluid valve. In particular, the directly controlled electromagnetically actuated fluid valve is a directly controlled electromagnetically actuated hydraulic valve. In such a direct-controlled electromagnetically actuated fluid valve having only one electromagnet for actuating the valve member, the valve member regularly assumes an end position when the electromagnet is not actuated. The electronic control unit can therefore implement end position detection of the valve member by applying the method according to the invention without requiring an independent position sensor for this purpose.

Furthermore, the problem is solved with a fluid system with an electromagnetically actuated fluid valve and an electronic control unit, wherein the electromagnetically actuated fluid valve comprises a valve member and, for actuating the valve member, a first electromagnet with a first coil and a first armature and a second electromagnet, which acts complementary to the first electromagnet, with a second coil and a second armature. Thereby, the electronic control unit is adapted to execute the method described above for determining the position of a valve member.

In particular, the fluid system is a hydraulic system. In particular, the electromagnetically actuated fluid valve is a directly controlled electromagnetically actuated fluid valve. In particular, the directly controlled electromagnetically actuated fluid valve is a directly controlled electromagnetically actuated hydraulic valve. In such a directly controlled electromagnetically actuated fluid valve having two complementarily acting electromagnets, one of the two electromagnets is regularly not actuated. By applying the method according to the invention, the electronic control unit can therefore continuously determine the position of the armature and thus the position of the valve member for the respective non-actuated electromagnet without requiring an independent position sensor for this purpose.

BRIEF DESCRIPTION OF THE DRAWINGS

The invention is explained in more detail below with reference to embodiments shown in the figures. Herein schematically.

DETAILED DESCRIPTION OF THE DRAWINGS

Figure 1:
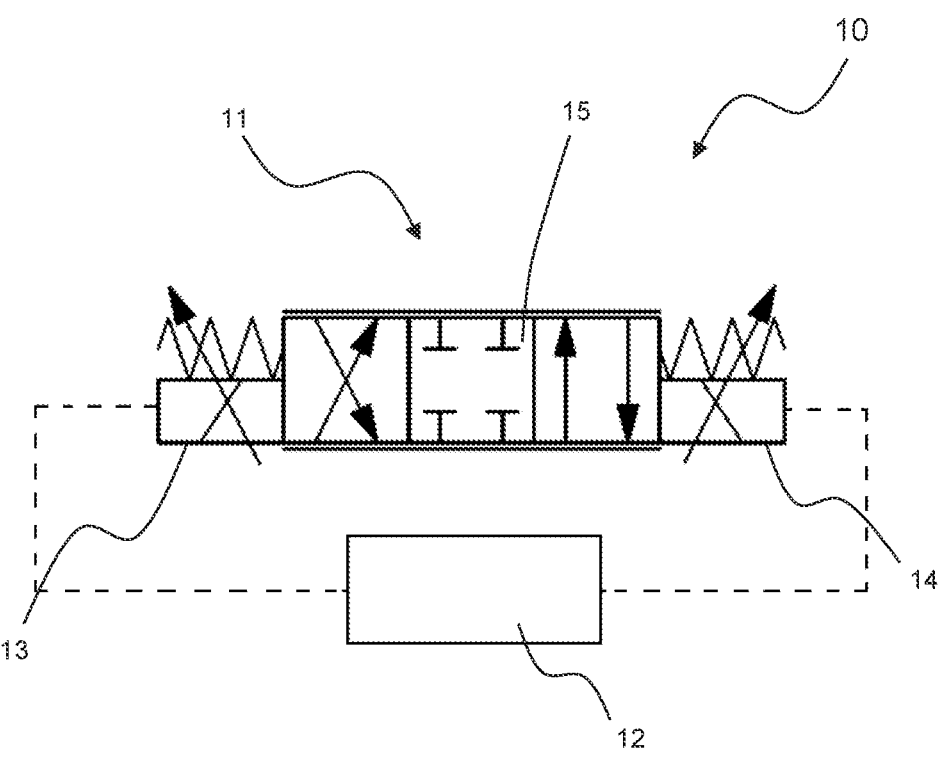
FIG. 1 is a first fluid system comprising a first directly controlled electromagnetically actuated fluid valve according to a first embodiment of the present invention.

FIG. 1 shows a first fluid system 10 according to the invention with an electromagnetically actuated fluid valve 11 and an electronic control unit 12. Here, The first fluid system 10 is a first hydraulic system 10 and the electromagnetically actuated fluid valve 11 is a directly controlled electromagnetically actuated hydraulic valve 11, namely a 4/3 spool valve which is configured as a proportional valve. In a known manner, the electromagnetically actuated fluid valve 11 comprises a valve member 15, in this case a spool piston, and a first electromagnet 13 and a second electromagnet 14 for actuating the valve member. In a known manner, the first electromagnet 13 comprises a first coil and a first armature. The second electromagnet 14 comprises, in a known manner, a second coil and a second armature. The second electromagnet 14 acts in a complementary manner to the first electromagnet 13. The electronic control unit 12 is adapted to execute a method according to the invention for determining the position of the valve member of the electromagnetically actuated fluid valve 11, which is described in detail below.

The electronic control unit 12 comprises a first current sensor for measuring the current in the first coil of the first electromagnet 13 and a second current sensor for measuring the current in the second coil of the second electromagnet 14. Furthermore, the electronic control unit 12 comprises a electromagnet control unit which controls the first electromagnet 13 and the second electromagnet 14 by a supply voltage. The control of the first electromagnet 13 and the second electromagnet 14 by the electronic control unit 12 is basically known, so it will not be discussed in detail here.

Figure 2:
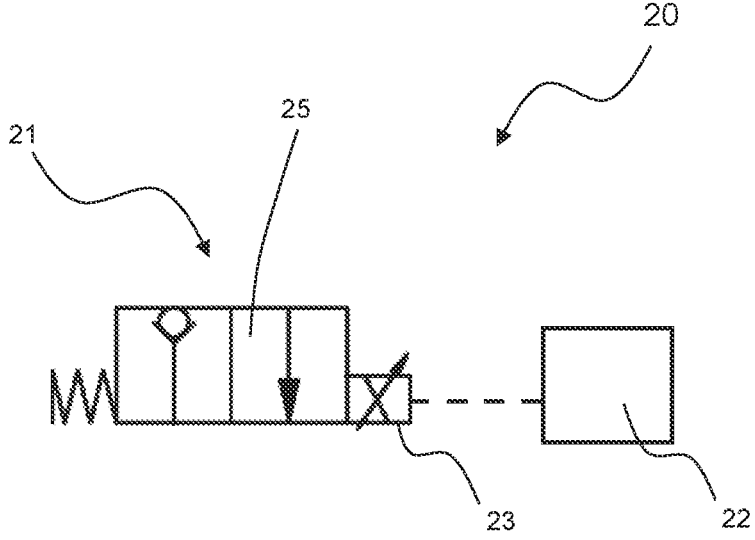
FIG. 2 is a second fluid system comprising a second directly controlled electromagnetically actuated fluid valve according to a second embodiment of the present invention.

FIG. 2 shows a second fluid system 20 according to the invention with an electromagnetically actuated fluid valve 21 and an electronic control unit 22. Here, the second fluid system 20 is a second hydraulic system 20 and the electromagnetically actuated fluid valve 21 is a directly controlled electromagnetically actuated hydraulic valve 21, namely a 2/2 seat valve which is configured as a switching valve. The electromagnetically actuated fluid valve 21 comprises in known manner a valve member 25, in this case a valve cone, and for actuating the valve member an electromagnet 23. The electromagnet 23 comprises in known manner a coil and an armature.

The electronic control unit 22 includes a current sensor for measuring the current in the coil of the electromagnet 23, and a electromagnet control unit which controls the electromagnet 23 by a supply voltage. The control of the electromagnet 23 by the electronic control unit 22 is known in principle, so it will not be discussed in detail here.

Figure 3:
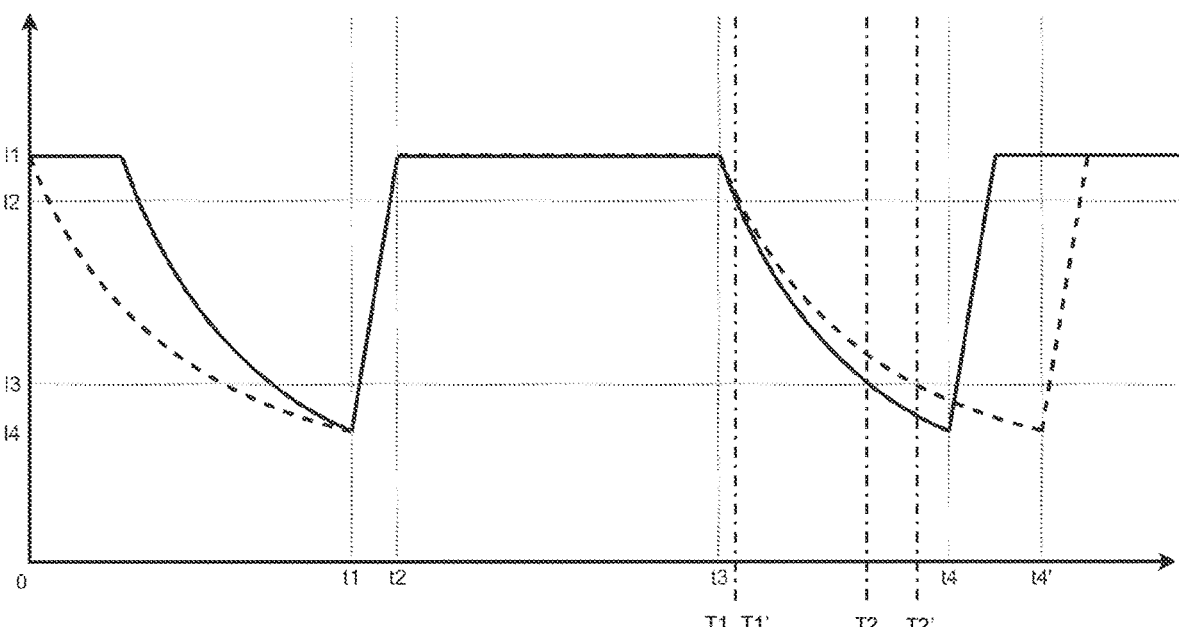
FIG. 3 is a diagram showing two current profiles over time illustrating a first method according to the invention.

With reference to FIGS. 1 and 3, a method according to the invention for determining the position of the valve member of the electromagnetically actuated fluid valve 11 of the first fluid system 10, which is executed by the electronic control unit 12, is described below.

First, the electronic control unit 12 determines an non-actuated electromagnet of the electromagnetically actuated fluid valve 11. Thus, the electronic control unit 12 determines whether the first electromagnet 13 or the second electromagnet 14 is currently not energized to actuate the valve member of the electromagnetically actuated fluid valve 11. When the electronic control unit 12 has determined which of the two electromagnets 13, 14 is not actuated, the electronic control unit 12 determines the position of the armature of the non-actuated electromagnet. Since it is not important for the description of the method according to the invention for determining the position of the armature of the non-actuated electromagnet whether the first electromagnet 13 or the second electromagnet 14 is not actuated, in the following the non-actuated electromagnet will be referred to collectively as electromagnet 13, 14.

To determine the position of the armature of the electromagnet 13, 14, the electronic control unit 12 applies a current profile in the coil of the electromagnet 13, 14, the current profile being substantially below a minimum actuating current of the electromagnet 13, 14. While the current in the coil of the electromagnet 13, 14 follows the current profile, the electronic control unit 12 determines a characteristic profile of the electromagnet 13, 14. Depending on the characteristic profile, the electronic control unit 12 calculates the position of the armature of the electromagnet 13, 14.

With reference to FIG. 3, it can be seen that the electronic control unit 12 initially sets the current in the coil of the electromagnet 13, 14 to a first defined current value I1 during a first time interval t1-t2. The first defined current value I1 is lower than the minimum actuating current of the electromagnet 13, 14. For example, if the minimum actuating current of the electromagnet 13, 14 is 500 mA, the first defined current value I1 may be 150 mA. Setting the current to the first defined current value I1 is carried out in the present case by means of a fast control with the aim of keeping the first time interval t1-t2 as short as possible. For this purpose, the electromagnet control unit of the electronic control unit 12 switches the supply voltage through unclocked until the current in the coil of the electromagnet 13, 14 has reached the first defined current value I1. The first defined current value I1 can also be set without the fast control.

Subsequently, the electronic control unit 12 regulates the current in the coil of the electromagnet 13, 14 to the first defined current value I1 during a second time interval t2-t3. The current is controlled by pulse width modulation. It is conceivable to implement the setting of the current to the first defined current value I1 as part of the control by pulse width modulation and to omit the fast control described above. This would lead to an extension of the first time interval t1-t2 and to a reduction of the measuring rate when determining the position of the armature of the electromagnet 13, 14.

The characteristic profile in the first method according to FIG. 3 comprises a compensation characteristic and a position characteristic.

During the second time interval t2-t3, the electronic control unit 12 determines the compensation characteristic of the electromagnet 13, 14. In particular, the electronic control unit 12 determines a temperature-dependent compensation characteristic, which in the present case is a copper resistance of the coil of the electromagnet 13, 14. For this purpose, the electronic control unit 12 determines the average voltage at the electromagnet 13, 14 during the second time interval t2-t3, which is necessary to control the current in the coil of the electromagnet 13, 14 to the first defined current value I1. Further, the electronic control unit 12 determines the average current in the coil of the electromagnet 13, 14 during the second time interval t2-t3. Thereby, the electronic control unit 12 may determine the first defined current value I1 as the average current in the coil of the electromagnet 13, 14 or measure and average the average current during the second time interval t2-t3 via the first current sensor or the second current sensor, respectively. Finally, the electronic control unit 12 calculates the compensation characteristic as a function of the average voltage and the average current. Thus, in the present case, the electronic control unit 12 calculates the copper resistance in the coil of the electromagnet 13, 14 by dividing the average voltage across the electromagnet 13, 14 by the average current in the coil of the electromagnet 13, 14 according to Ohm's law.

To determine the average voltage at the electromagnet, the electronic control unit 12 measures the supply voltage during the second time interval t2-t3 and multiplies the measured supply voltage by a duty cycle of the pulse width modulation. Alternatively, the electronic control unit 12 may additionally comprise a voltage sensor that directly measures the voltage at the electromagnet 13, 14 and averages it over the second time interval t2-t3 to determine the average voltage at the electromagnet.

Thus, the electronic control unit 12 has determined the compensation characteristic of the electromagnet 13, 14, in this case the copper resistance of the coil of the electromagnet 13, 14, during the second time interval t2-t3.

In the next step, the electronic control unit 12 turns off the current in the coil of the electromagnet 13, 14 during a third time interval t3-t4/t4'. The electromagnet 13, 14 is thus in active free-running mode during the third time interval t3-t4/t4' and the current in the electromagnet 13, 14 is thereby substantially reduced via the copper resistance in the coil of the electromagnet 13, 14. The energy stored in the electromagnet 13, 14 depends largely on the inductance of the electromagnet 13, 14. The inductance in turn depends on how far the armature of the electromagnet 13, 14 is located in the coil.

During the third time interval t3-t4/t4', the electronic control unit determines the position characteristic of the electromagnet 13, 14. In particular, the electronic control unit determines a temperature- and induction-dependent position characteristic of the electromagnet 13, 14, in this case the current decrease speed in the coil of the electromagnet 13, 14.

For determining the position characteristic, the electronic control unit 12 detects a first instant T1, T1', at which the current in the coil of the electromagnet 13, 14 reaches a second defined current value I2. Furthermore, the electronic control unit 12 detects a second instant T2, T2' at which the current in the coil of the electromagnet 13, 14 reaches a third defined current value I3 which is lower than the second defined current value I2. Finally, the electronic control unit 12 calculates the position characteristic as a function of a time difference between the second instant T2, T2' and the first instant T1, T1' and a current difference between the second defined current value I2 and the third defined current value I3.

As shown in FIG. 3, the current difference between the second defined current value I2 and the third defined current value I3 always remains constant in order to have a comparable reference variable. The time difference between the second instant T2, T2' and the first instant T1, T1', on the other hand, depends on the inductance of the electromagnet 13, 14 and thus on the position of the armature in the coil of the electromagnet 13, 14.

FIG. 3 shows two curves for different positions of the armature. In the case of the solid curve, the electromagnet 13, 14 has a lower inductance than in the case of the dashed curve, which is why the current decreases faster in the third time interval t3-t4 for the solid curve than in the third time interval t3-t4' for the dashed curve. The first instant T1, which belongs to the solid curve, and the first instant T1', which belongs to the dashed curve, are still hardly distinguishable in FIG. 3, although it is already visible here that the dashed curve reaches the second defined current value I2 somewhat later than the solid curve. The second instant T2 of the solid curve, on the other hand, is significantly earlier than the second instant T2' of the dashed curve.

Depending on the compensation characteristic, the copper resistance of the coil of the electromagnet 13, 14, and the position characteristic, the current decrease speed in the coil of the electromagnet 13, 14, the electronic control unit 12 now calculates the position of the armature of the electromagnet 13, 14.

Finally, the electronic control unit 12 calculates the position of the valve member of the electromagnetically actuated fluid valve 11 depending on the position of the armature of the electromagnet 13, 14.

After the calculations of the electronic control unit 12 are completed, the electronic control unit 12 repeats the described process steps. As can be seen in FIG. 3, for example, the electronic control unit 12 starts repeating the process steps when the current in the coil of the electromagnet 13, 14 reaches a fourth current value I4. The fourth current value I4 is variable and depends on the latency of the electronic control unit 12 after detecting the second instant T2/T2' and the subsequent calculation steps. Even though in FIGS. 3 and 4 the fourth current value I4 is shown as uniform for both curves, it is clear to the skilled person that the fourth current value I4 can be different for both curves.

In the direct-controlled electromagnetically actuated fluid valve 11, the position of the valve member is linearly dependent on the position of the first armature in the first coil of the first electromagnet 13 and likewise linearly dependent on the position of the second armature in the second coil of the second electromagnet 14. Thus, by determining the position of the armature of the respective non-actuated electromagnet 13, 14, the position of the valve member of the electromagnetically actuated fluid valve 11 can be continuously determined without having to provide a position sensor as a separate component for this purpose.

The electronic control unit 22 of the second fluid system 20 also executes a method according to the invention for determining the position of the valve member of the electromagnetically actuated fluid valve 21. This method differs from the method described for the electronic control unit 12 in that the electronic control unit 22 does not need to determine which electromagnet is not actuated, since the electromagnetically actuated fluid valve 21 comprises only one electromagnet 23. Thus, the electronic control unit 22 performs the method according to the invention for determining the position of the valve member of the electromagnetically actuated valve 21 only when the electromagnet 23 is not actuated.

In the second fluid system 20, the method according to the invention thus relates to end position monitoring of the electromagnetically actuated fluid valve 21. Here, the valve member is basically returned to an end position by a spring element when the electromagnet 23 is not actuated. However, with fluid valves of this type, contamination or other disturbance factors can cause the valve member not to be fully closed. Thus, by carrying out the method of determining the position of the valve member according to the invention, the electronic control unit 22 can detect, for example, that the valve member is not fully in the closed position even though the electromagnet 23 is not actuated, and warn a user accordingly or automatically initiate safety measures.

Figure 4:
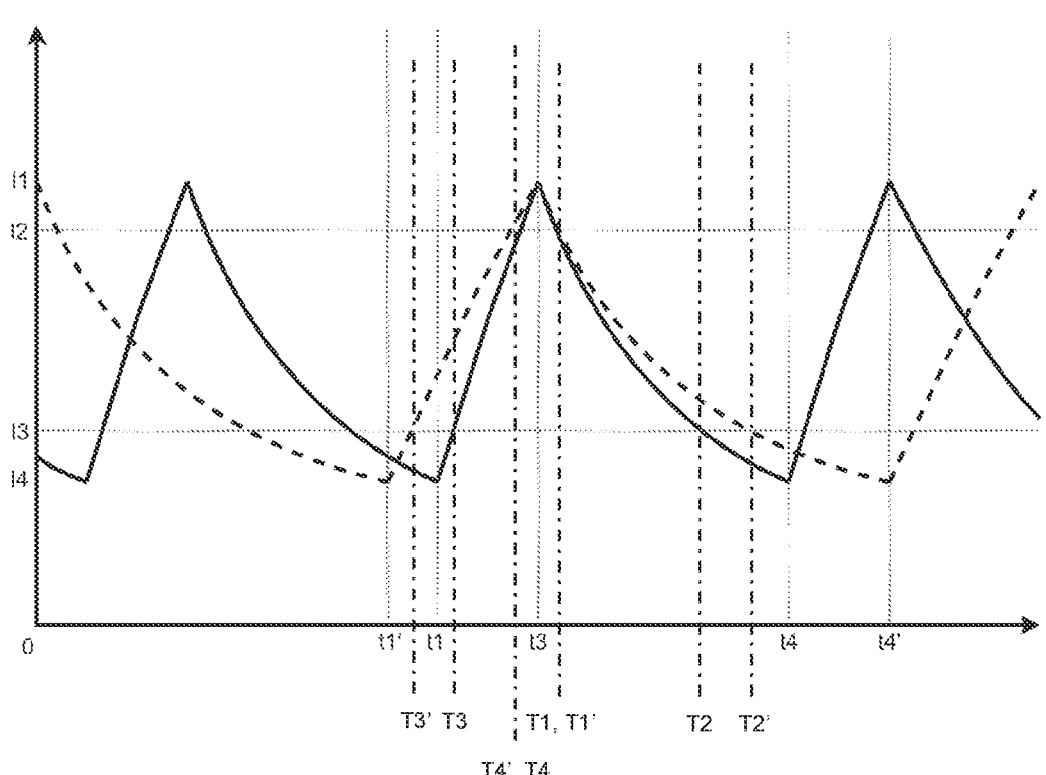
FIG. 4 is a diagram showing two current profiles over time illustrating a second method according to the invention.

FIG. 4 shows two current profiles illustrating a second alternative method according to the invention for determining the position of an armature of an electromagnet. As can be seen in FIG. 4, the alternative method differs from the method described above with reference to FIG. 3 in that the first time interval t1-t2 and the second time interval t2-t3 according to FIG. 3 are combined to form a first time interval t1/t1'-t3. With regard to the third time interval t3-t4/t4' and the determination of the position characteristic, the two methods do not differ. Accordingly, only the differences with regard to the first time interval t1/t1'-t3 will be discussed below.

The alternative method according to FIG. 4 can also be applied to the first fluid system 10 and to the second fluid system 20. The following description with regard to the first fluid system 10 is therefore directly transferable to the second fluid system 20.

Application of the current profile according to the alternative method comprises that the electronic control unit 12 applies a controlled voltage to the coil of the electromagnet 13, 14 during the first time interval t1/t1'-t3 until the first defined current value I1 is reached. Subsequently, the electronic control unit 12 turns off the current in the coil of the electromagnet 13, 14 during the third time interval t3-t4/t4' analogously to the procedure described with respect to FIG. 3 and determines the position characteristic of the electromagnet 13, 14.

The characteristic profile in the method according to FIG. 4 comprises the position characteristic already described and an alternative compensation characteristic.

During the first time interval t1/t1'-t3, the electronic control unit 12 determines the alternative compensation characteristic. In the present case, the electronic control unit 12 determines the current increase speed during the first time interval t1/t1'-t3 as the compensation characteristic. The determination of the current increase speed during the first time interval t1/t1'-t3 thereby proceeds on the basis of the third defined current value I3 and the second defined current value I2 in an inversely analogous manner to the determination of the current decrease speed during the third time interval t3-t4/t4' described above.

Thus, a third instant T3, T3' is detected at which the current in the coil of the electromagnet 13, 14 reaches the third defined current value I3 and a fourth instant T4, T4' is detected at which the current in the coil of the electromagnet 13, 14 reaches the second defined current value I2. From the time difference between the fourth instant T4, T4' and the third instant T3, T3' and the current difference between the second defined current value I2 and the third defined current value I3, the electronic control unit 12 calculates the current increase speed in the coil of the electromagnet 13, 14.

FIG. 4 also shows two curves for different positions of the armature in analogy to FIG. 3. It can be clearly seen that the current increase speed also depends on the position of the armature in the coil of the electromagnet 13, 14. In the case of the solid curve, the electromagnet 13, 14 has a lower inductance than in the case of the dashed curve, which is why the current builds up faster in the first time interval t1-t3 in the case of the solid curve than in the first time interval t1'-t3 in the case of the dashed curve.

The temperature dependence of the current increase speed is inverse to the temperature dependence of the current decrease speed. Thus, the current increase speed in the coil of the electromagnet 13, 14 can be used as a compensation characteristic for the temperature.

LIST OF REFERENCE SIGNS 10 first fluid system/first hydraulic system
11 electromagnetically actuated fluid valve/directly controlled electromagnetically actuated hydraulic valve
12 electronic control unit
13 first electromagnet
14 second electromagnet
15 valve member/spool piston
20 second fluid system/second hydraulic system
21 electromagnetically actuated fluid valve/directly controlled electromagnetically actuated hydraulic valve
22 electronic control unit
23 electromagnet
25 valve member/valve cone
I1 first defined current value
I2 second defined current value
I3 third defined current value
I4 fourth current value
t1-t2 first time interval
t2-t3 second time interval
t3-t4/t4' third time interval
T1, T1' first instant
T2, T2' second instant
T3, T3' third instant
T4, T4' fourth instant

The invention claimed is:

1. A method for determining a position of an armature of an electromagnet of an electromagnetically actuated fluid valve, the electromagnet including a coil and the armature, the method being executed by an electronic control unit and comprising the steps of:
    applying a current profile in the coil of the electromagnet, the current profile being below a minimum actuation current of the electromagnet, comprising:
        setting a current in the coil of the electromagnet to a first defined current value during a first time interval,
        regulating the current in the coil of the electromagnet to the first defined current value during a second time interval, and
        turning off the current in the coil of the electromagnet during a third time interval;
    determining a characteristic profile of the electromagnet by:
        determining a compensation characteristic of the electromagnet during the second time interval, and
        determining a position characteristic of the electromagnet during the third time interval; and
    calculating the position of the armature of the electromagnet depending on the characteristic profile.

2. The method according to claim 1, wherein the compensation characteristic of the electromagnet is a temperature-dependent compensation characteristic of the electromagnet.

3. The method according to claim 2, wherein the temperature-dependent compensation characteristic of the electromagnet is a copper resistance of the coil of the electromagnet.

4. The method according to claim 1, wherein the position characteristic of the electromagnet is a temperature- and inductance-dependent position characteristic of the electromagnet.

5. The method according to claim 4, wherein the temperature- and inductance-dependent position characteristic of the electromagnet is a current decrease speed in the coil of the electromagnet.

6. The method according to claim 1, wherein regulating the current in the coil of the electromagnet to the first defined current value during the second time interval is performed by pulse width modulation.

7. The method according to claim 1, wherein determining the compensation characteristic of the electromagnet comprises:
    determining an average voltage across the electromagnet,
    determining an average current in the coil of the electromagnet and
    calculating the compensation characteristic as a function of the average voltage and the average current.

8. The method according to claim 7, wherein determining the average voltage across the electromagnet comprises:
    measuring a supply voltage during the second time interval and
    multiplying the measured supply voltage with a duty cycle of a pulse width modulation.

9. The method according to claim 7, wherein determining the average voltage across the electromagnet comprises:
    measuring a voltage across the electromagnet during the second time interval, and
    averaging the measured voltage at the electromagnet.

10. The method according to claim 7, wherein determining the average current in the coil of the electromagnet comprises:
    measuring the current in the coil of the electromagnet during the second time interval, and
    averaging the measured current in the coil of the electromagnet.

11. The method according to claim 7, wherein determining the average current in the coil of the electromagnet comprises:
    defining the first defined current value as the average current in the coil of the electromagnet.

12. The method according to claim 1, wherein determining the position characteristic comprises:
    detecting a first instant at which the current in the coil of the electromagnet reaches a second defined current value,
    detecting a second instant at which the current in the coil of the electromagnet reaches a third defined current value lower than the second defined current value, and
    calculating the position characteristic as a function of a time difference between the second instant and the first instant and a current difference between the second defined current value and the third defined current value.

13. The method according to claim 1, further comprising repeating the applying, the determining, and the calculating.

14. A method of determining a position of a valve member of an electromagnetically actuated fluid valve, the electromagnetically actuated fluid valve including the valve member and an electromagnet for actuating the valve member, the electromagnet including a coil and an armature, the method comprising the steps of:
    determining the position of the armature of the electromagnet by the method according to claim 1, and
    calculating the position of the valve member depending on the position of the armature of the electromagnet.

15. A fluid system comprising an electromagnetically actuated fluid valve and an electronic control unit, wherein the electromagnetically actuated fluid valve includes a valve member and an electromagnet for actuating the valve member, the electromagnet including a coil and an armature, wherein the electronic control unit is configured to execute the method according to claim 14 when the electromagnet is not actuated.

16. A method of determining a position of a valve member of an electromagnetically actuated fluid valve, the electromagnetically actuated fluid valve including the valve member and, for actuating the valve member, a first electromagnet having a first coil and a first armature, and a second electromagnet, acting complementarily to the first electromagnet, having a second coil and a second armature, the method comprising the steps of:

determining an non-actuated electromagnet of the electromagnetically actuated fluid valve, determining the position of the armature of the non-actuated electromagnet by the method according to claim 1, and calculating the position of the valve member as a function of the position of the armature of the non-actuated electromagnet.

17. A fluid system comprising an electromagnetically actuated fluid valve and an electronic control unit, wherein the electromagnetically actuated fluid valve includes a valve member and, for actuating the valve member, a first electromagnet with a first coil and a first armature and a second electromagnet, acting complementarily to the first electromagnet, with a second coil and a second armature, wherein the electronic control unit is adapted to perform the method according to claim 16.

18. A method for determining a position of an armature of an electromagnet of an electromagnetically actuated fluid valve, the electromagnet including a coil and the armature, the method being executed by an electronic control unit and comprising:

applying a current profile in the coil of the electromagnet, the current profile being below a minimum actuation current of the electromagnet, comprising:

applying a regulated voltage to the coil of the electromagnet during a first time interval until a first defined current value is reached, and turning off a current in the coil of the electromagnet during a third time interval;

determining a characteristic profile of the electromagnet, comprising:

determining a compensation characteristic of the electromagnet during the first time interval, and determining a position characteristic of the electromagnet during the third time interval; and calculating the position of the armature of the electromagnet depending on the characteristic profile.

19. The method according to claim 18, wherein the compensation characteristic is a current increase speed in the coil of the electromagnet.

* * * * *